(No Model.)

E. F. PARAMORE.
SUSPENDER HOOK.

No. 399,775. Patented Mar. 19, 1889.

WITNESSES:
F. McArdle
C. Sedgwick

INVENTOR:
E. F. Paramore
BY Munn & Co.
ATTORNEYS.

UNITED STATES PATENT OFFICE.

EDWARD FRANK PARAMORE, OF OCONTO, WISCONSIN.

SUSPENDER-HOOK.

SPECIFICATION forming part of Letters Patent No. 399,775, dated March 19, 1889.

Application filed September 12, 1888. Serial No. 285,258. (No model.)

*To all whom it may concern:*

Be it known that I, EDWARD FRANK PARAMORE, of Oconto, in the county of Oconto and State of Wisconsin, have invented a new and Improved Detachable Fastening for Suspenders, of which the following is a full, clear, and exact description.

This invention relates to a device designed to take the place of a suspender-button, and has for its object to provide a detachable fastening for suspenders, which may readily be attached to and detached from a pair of trousers, and which will be serviceable and effective in use.

The invention consists in a detachable fastening for suspenders, constructed and arranged as hereinafter described and claimed.

Reference is to be had to the accompanying drawings, forming a part of this specification, in which similar letters of reference indicate corresponding parts in all the figures.

Figure 1:
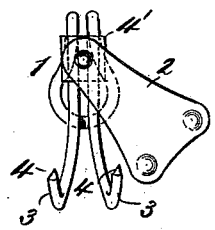
Figure 2:
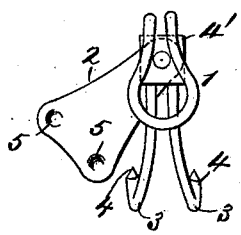
Figure 3:
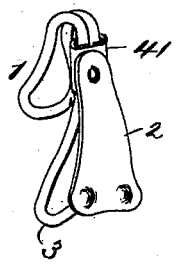

Figure 1 is a rear view of the suspender-fastening with fastening-plate open. Fig. 2 is a front view thereof, and Fig. 3 is a perspective view with fastening-plate closed.

In carrying out the invention I form the fastening in two parts, consisting of the hook 1 and the fastening-plate 2. The hook 1 is preferably constructed of a single piece of wire folded and bent to form the rearwardly-projecting hooks 3 with pointed ends 4. The hooks 3 preferably diverge somewhat, so as to have a steady hold when engaged with the waistband of a pair of trousers. The fastening-plate 2 is secured to hook 1 in any suitable way to open and close against the points of hooks 3, and, as shown, is preferably pivoted to the back of hook 1 on a strip, 4', folded about the wires forming the back of hook 1 and secured by means of solder, or in any other suitable way.

The plate 2 is pivoted so that its lower end swings laterally over the points 4 of hooks 3, and is formed with indentations or recesses 5, in which the points 4 may rest and hold the plate 2 in closed position. In use the plate 2 is swung open and hook 1 is attached to the waistband of a pair of trousers in lieu of the suspender-button by passing the hooks 3 through the waistband. The hooks 3 are then held in place by swinging the plate 2 into closed position over the hooks 3, the points 4 of the latter engaging the recesses 5. A suspender may then be engaged with the hook 1. A single hook, 1, may be employed where a suspender-button has been pulled off, or several hooks, 1, may be used in place of all the suspender-buttons. The hooks 3 and fastening-plate 2 afford a secure means for preventing the hook 1 from being pulled off, and the whole device serves as an efficient fastening for suspenders.

Having thus described my invention, what I claim as new, and desire to secure by Letters Patent, is—

A detachable fastening for suspenders, consisting of hook 1, constructed of a single piece of wire and formed with the rearwardly-projecting hooks 3, having pointed ends 4, and the laterally-swinging fastening-plate 2, pivoted to the back of hook 1, and having recesses 5, with which the points 4 are adapted to engage, substantially as shown and described.

EDWARD FRANK PARAMORE.

Witnesses:
  GEO. BEYER,
  W. P. COOT.